United States Patent [19]

Wilde

[11] Patent Number: 5,203,617
[45] Date of Patent: Apr. 20, 1993

[54] ELECTROMAGNETICALLY-ACTUATED 2/2-WAY VALVE, FOR HYDRAULIC MOTOR VEHICLE BRAKE SYSTEMS HAVING AN ANTI-SKID AND TRACTION CONTROL APPARATUS

[75] Inventor: Werner Wilde, Schwieberdingen, Fed. Rep. of Germany

[73] Assignee: Robert Bosch GmbH, Stuttgart, Fed. Rep. of Germany

[21] Appl. No.: 789,555

[22] Filed: Nov. 8, 1991

[30] Foreign Application Priority Data

Jan. 30, 1991 [DE] Fed. Rep. of Germany ....... 4102626

[51] Int. Cl.$^5$ ............ F15B 13/44; B60T 8/36; F16K 31/06; B60K 28/16
[52] U.S. Cl. ............... 303/116.2; 303/119.2; 303/84.2; 303/113.2; 137/110; 137/599
[58] Field of Search ............ 303/113 TR, 116 SP, 303/119 SV, 116 R, DIG. 1, DIG. 2, 84.1-84.2; 137/110, 599, 625.64, 596.17

[56] References Cited

U.S. PATENT DOCUMENTS

| 4,529,166 | 7/1985 | Klausen et al. ............ 251/141 |
| 4,714,300 | 12/1987 | Heess et al. ............ 303/119.S V X |
| 4,844,119 | 7/1989 | Martinic ............ 137/596.17 |
| 4,861,116 | 8/1989 | Bernhardt et al. ............ 303/113 TR X |
| 4,898,430 | 2/1990 | Becher-Endrigkert et al. ... 303/84.2 |
| 4,922,966 | 5/1990 | Kaes et al. ............ 303/119 SV X |

FOREIGN PATENT DOCUMENTS

| 0355055 | 2/1990 | European Pat. Off. |
| 1110969 | 7/1961 | Fed. Rep. of Germany ............ 137/625.64 |
| 1110895 | 2/1956 | France ............ 137/625.64 |
| 1300455 | 6/1962 | France ............ 137/625.64 |

Primary Examiner—Matthew C. Graham
Assistant Examiner—Josie A. Ballato
Attorney, Agent, or Firm—Edwin E. Greigg; Ronald E. Greigg

[57] ABSTRACT

A structurally simplified 2/2-way shutoff valve having a parallel-connected pressure limiting valve. The shutoff valve has a first closing body that cooperates with a first valve seat. The first valve seat is embodied on a second closing body pierced by a conduit, which second closing body, under the influence of a spring, engages a second valve seat attached firmly to a wall which is secured to the housing. The biasing force of this spring is greater than a closing force exerted by an armature upon the first closing body and oriented in the opposite direction from the biasing force. The second closing body and the second valve seat form a pressure limiting valve, which is disposed in the housing of the shutoff valve. The invention is applicable to hydraulic motor vehicle brake systems having an anti-skid and traction control apparatus.

2 Claims, 2 Drawing Sheets

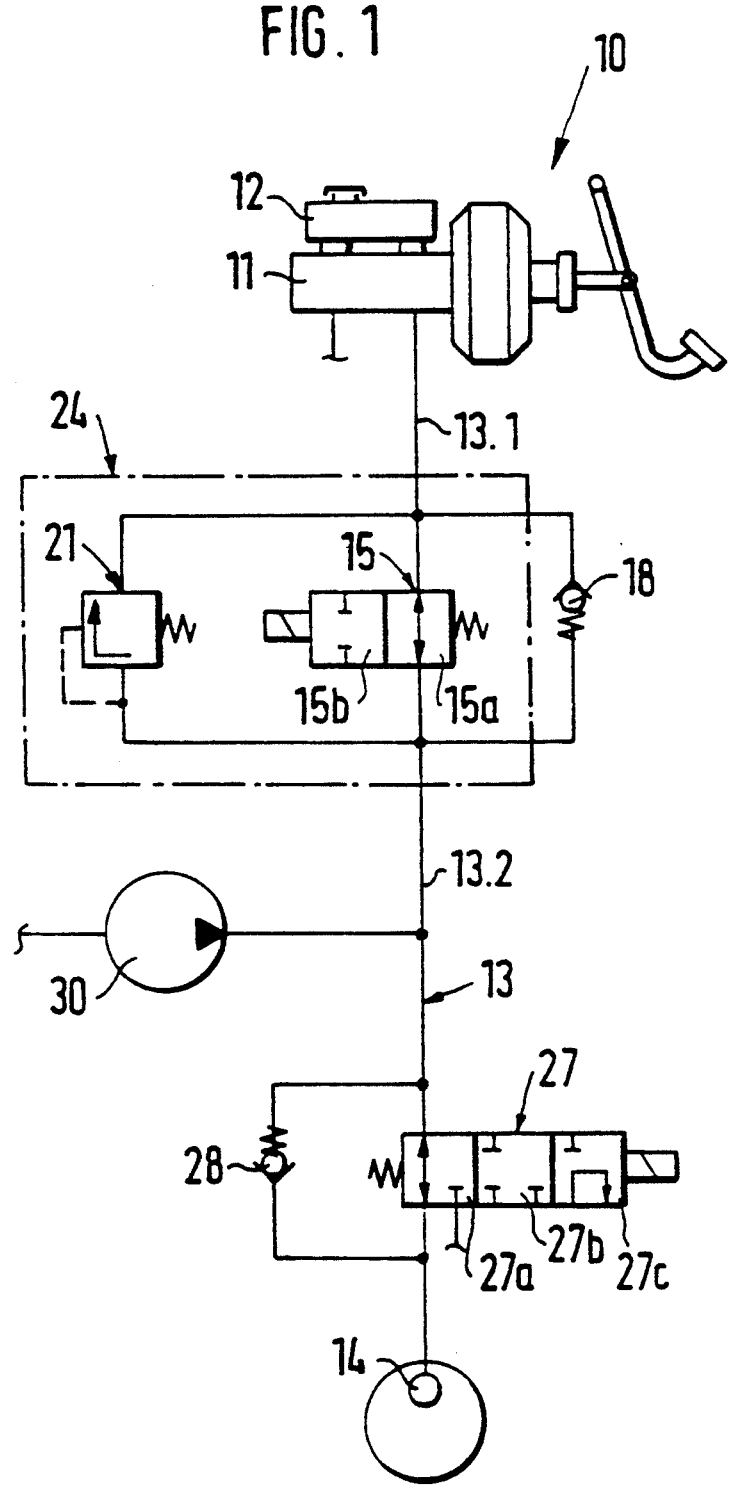

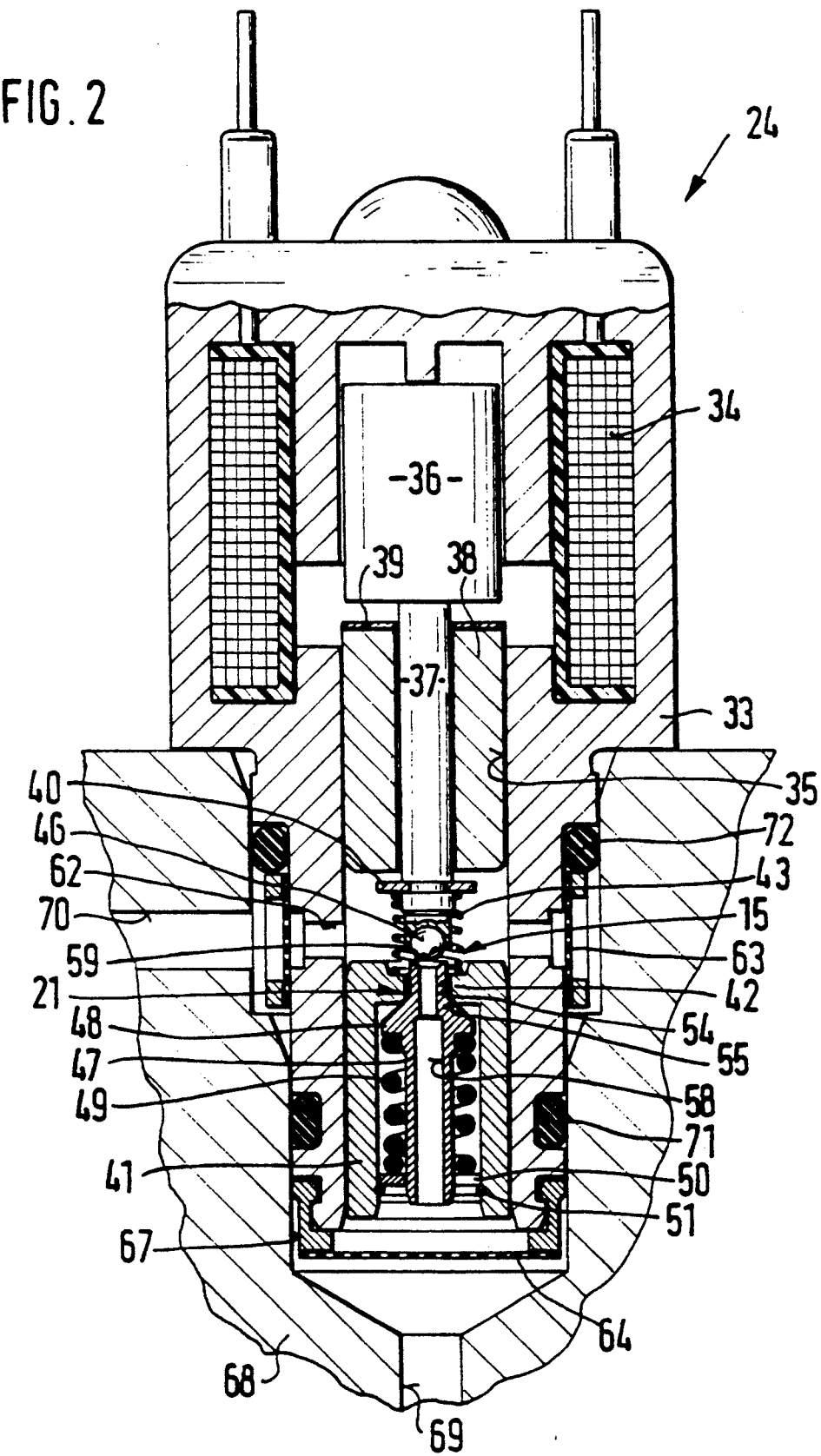

ELECTROMAGNETICALLY-ACTUATED 2/2-WAY VALVE, FOR HYDRAULIC MOTOR VEHICLE BRAKE SYSTEMS HAVING AN ANTI-SKID AND TRACTION CONTROL APPARATUS

BACKGROUND OF THE INVENTION

Hydraulic vehicle brake systems with an anti-skid and traction control apparatus have a pressure control valve assembly in a brake line that extends between a master brake cylinder and at least one wheel brake. This pressure control valve assembly serves to modulate brake pressure in the wheel brake if the danger of wheel locking or a loss of traction at the associated vehicle wheel occurs. In the case of a loss of traction, a high-pressure pump of the brake system pumps pressure fluid into the brake line. So that the pressure fluid does not drain out through the master brake cylinder, a shutoff valve in the form of an electromagnetically-actuated 2/2-way valve is disposed in the brake line between the feed point of the pump and the master brake cylinder. Since the pump, when pressure fluid is not withdrawn, would cause an impermissibly great brake connected parallel to the shutoff valve.

A 2/2-way valve of the type referred to at the outset is known for instance from U.S. Pat. No. 4,529,166. Under the influence of the restoring spring, this valve assumes its open position, in which both valve connections communicate hydraulically. The generation of a magnetic field moves the armature counter to the action of the restoring spring, so that it presses the closing body against the valve seat: the valve is now in its closing position. The closing body, received longitudinally displaceably in the armature, is then under the influence of a compensation spring supported firmly on the housing. There is no particular provision made for limiting impermissibly high pressures occurring on the downstream side.

OBJECT AND SUMMARY OF THE INVENTION

The multi-position valve according to the invention has an advantage over the prior art that a pressure limiting valve is disposed in the housing in a space-saving manner; this contributes to simplifying multi-position valve and the pressure limiting valve.

In an advantageous further feature of the multi-position valve according to the invention, an assembly unit including the pressure limiting valve is created that can be tested before the process of being joined to the housing of the multi-position valve.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 1 shows part of a circuit diagram of a hydraulic brake system having a valve unit comprising a 2/2-way valve and a pressure limiting valve; and FIG. 2 is a longitudinal section through the valve unit, showing the structural design.

DESCRIPTION OF THE PREFERRED EMBODIMENT

The circuit diagram shown in FIG. 1 shows only part of a hydraulic brake system 10 for a motor vehicle having an anti-skid and traction control apparatus.

The brake system 10 has a pedal-actuatable multi-circuit master brake cylinder 11 as a pressure generator, with a pressure fluid supply container 12. At least one line 13, as a brake line, leads from the master brake cylinder 11 to at least one wheel brake 14, as a consumer. A shutoff valve 15 in the form of a 2/2-way valve is disposed in the line 13. The shutoff valve 15 has an open position 15a that can be produced by spring-actuation, in which quantities of pressure fluid can be displaced between the master brake cylinder 11 and the wheel brake 14. The shutoff valve 15 also has a closing position 15b that can be produced by electromagnetic actuation. In this closing position 15b, the shutoff valve 15 interrupts a flow of pressure fluid between a line segment 13.1 of the line 13 toward the master brake cylinder and a line segment 13.2 toward the wheel brake.

A one-way check valve 18 is disposed parallel to the shutoff valve 15 and allows a flow of pressure fluid from the master brake cylinder 11 to the wheel brake 14, bypassing the shutoff valve.

A pressure limiting valve 21 is also connected parallel to the shutoff valve 15. The pressure limiting valve 21 is capable of opening counter to a spring force if a predetermined response pressure is exceeded downstream of the 2/2-way valve 15, so that quantities of pressure fluid from the line segment 13.2 can be diverted to the line segment 13.1 and thus to the master brake cylinder 11. The pressure limiting valve 21 therefore prevents an impermissibly high pressure increase in the region of the brake system 10 toward the wheel brake.

As indicated in dot-dashed lines in FIG. 1, the shutoff valve 15 and the pressure limiting valve 21 are structurally combined to make a valve unit 24. This valve unit 24 will be described in further detail hereinafter.

Between the shutoff valve 15 and the wheel brake 14, a pressure control valve assembly 27, as an element of the anti-skid and traction control apparatus, is also disposed in the line 13. The pressure control valve assembly 27 has a position 27a that can be produced by spring actuation, in which the line segment 13.2 provides a passage to the wheel brake 14. The pressure control valve assembly 27 also has a position 27b that can be established by electromagnetic actuation for holding pressure in the wheel brake 14; in this position, the line segment 13.2 to the wheel brake is interrupted. A third position 27c of the pressure control valve assembly 27, which can also be adjusted by electromagnetic actuation, serves to divert quantities of pressure fluid out of the wheel brake 14 for the sake of pressure reduction. A one-way check valve 28 is disposed parallel to the pressure control valve assembly 27 and with it a flow of pressure fluid is possible from the wheel brake 14 to the master brake cylinder 11, bypassing the pressure control valve assembly.

A pressure source 30 in the form of a high-pressure pump is also connected to the line segment 13.2. In traction control operation, during which the shutoff valve 15 is shifted into its closing position 15.b, the pressure source 30 is capable of feeding pressure fluid into the line 13. Since in the positions 27b and 27c of the pressure control valve assembly 27, the pressure fluid cannot be received by the wheel brake 14, the pressure limiting valve 21 opens if its response pressure is exceeded and diverts the pressure fluid to the master brake cylinder 11.

The valve unit 24 has the structure shown in FIG. 2:

A housing 33 with an electrical coil 34 has a longitudinal bore 35. An armature 36 associated with the coil 34 is received in the longitudinal bore 35. A tappet 37 cooperating coaxially with the armature 36 extends through a pole piece 38 that is press-fitted into the longitudinal bore 35. A remanent air disk 39 is located between the armature 36 and the pole piece 38. A disk 40 is secured on the segment of the tappet 37 protruding out of the pole piece 38. Below the tappet 37, a sleeve 41 is press-fitted into the longitudinal bore 35. The sleeve is open at the bottom and includes a shoulder that forms a wall 42 which is fixed or secured to the housing 33. The sleeve is firmly attached to the housing defined by the longitudinal bore 35. A restoring spring 43 in the form of a helical compression spring is located between the disk 40 of the tappet 37 and the wall 42 of the sleeve.

A ball is received in the free end of the tappet 37, as a closing body 46 for the shutoff valve 15. A second closing body 47, substantially taking the form of a hollow cylinder, is located in the sleeve 41. The second closing body 47, extending coaxially with the sleeve 41 and tappet 37, has a collar 48 for the engagement of a second spring 49 received in the sleeve 41. The second spring 49, likewise embodied as a helical compression spring, is supported on an annular disk 50 that includes flow openings that provides a passage for pressure fluid. This disk is in turn held on the open side of the sleeve 41 by a snap ring 51.

The sleeve 41 has a coaxially extending through bore 54 in the wall 42. On its side remote from the first closing body 46 of the tappet 37, the wall 42 of the sleeve 41 has a valve seat 55 defining the through bore 54. The second closing body 47, in the region of its collar 48, cooperates with this valve seat 55. The valve seat 55 and the second closing body 47 form the pressure limiting valve 21.

The second closing body 47 is penetrated by a coaxially extending conduit 58. This conduit 58 ends in a valve seat 59 on the side of the first closing body 46 of the tappet 37. The valve seat 59 and the first closing body 46 form the shutoff valve 15.

A transverse bore 62 discharges into the longitudinal bore 35 of the housing 33, above the wall 42 of the sleeve 41. In the region of the transverse bore 62, the housing 33 is surrounded by a sleeve filter 63. On its face end remote from the armature, the housing 33 has a disk filter 64.

The valve unit 24 is inserted into a receiving bore 67 of a housing block 68 and secured to the housing block in a manner not shown. A bore, acting as a valve connection 69 discharges into the receiving bore 67 at its bottom. The bore corresponds to the line segment 13.1 of the brake line 13 that leads to the master brake cylinder 11. In the region of the transverse bore 62, a radially extending bore begins at the receiving bore 67 and acts as a valve connection 70. This bore corresponds to the line segment 13.2 of the brake line 13 leading to the wheel brake 14. Between the two valve connections 69 and 70, the housing 33 of the valve unit 24 is sealed off from the receiving bore 67 by a sealing ring 71. A second sealing ring 72 closes off the receiving bore 67 from the atmosphere in a pressure-fluid-tight manner.

The shutoff valve 15 embodied as a 2/2-way valve and the pressure limiting valve 21, which are combined in the valve unit 24, have the following function:

In the position of the shutoff valve 15 shown in FIG. 2, in which the coil 34 is not excited and the restoring spring 43 therefore keeps the first closing body 46 spaced apart from the valve seat 59, the shutoff valve assumes its open position 15a. In this position, a flow of pressure fluid from the master brake cylinder 11 through the valve connection 69 into the receiving bore 67 of the housing block 68, through the conduit 58 of the second closing body 47, through the open valve seat 59, through the transverse bore 62 of the housing 33 and through the valve connection 70 to the wheel brake 14, and vice, versa, is possible.

If the coil 34 is excited, the magnetic force acting upon the armature 36 overcomes the counteracting force of the restoring spring 43, so that after a partial armature stroke, the first closing body 46 strikes the valve seat 59 on the second closing body 47. The shutoff valve 15, now assuming its blocking position 15b, prevents any flow of pressure fluid through the valve unit 24.

For the reasons referred to at the outset, high pressures can arise toward the wheel brake if the shutoff valve 15 is closed. Through the valve connection 70 and the transverse bore 62, these high pressures act upon the cross-sectional area of the second closing body 47 acting inside the valve seat 55. If the response pressure of the pressure limiting valve 21 is exceeded, the opening force exerted upon the second closing body 47 by the pressure fluid overcomes the biasing force of the second spring 49. The second closing body 47 therefore lifts from the valve seat 55, so that partial quantities of pressure fluid can drain out through the sleeve 41 to the valve connection 69 in the housing block 68. At this very short stroke of the second closing body 47, the shutoff valve 15 remains closed, because the closing force generated by the armature 36 and the still-available remaining stroke of the armature 36 assure that the first closing body 46 remains in engagement with the valve seat 59 of the second closing body 47. Since the armature, tappet and closing valve 46 moves with the second closing body 47 when the second closing body opens, the fluid flows from the valve connection 70, bore 62 and passes through the pressure limiting valve 21 back to the master brake cylinder via outlet 69. After the impermissibly high pressure in the wheel brake 14 has been reduced, the pressure limiting valve 21 returns to its closing position.

When the coil 34 is turned off, the magnetic field acting upon the armature 36 collapses, and the restoring spring 43 moves the armature 36, the tappet 37, and the first closing body 46 to the open position, shown, of the shutoff valve 15.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An electromagnetically-actuated multiposition 2/2-way shutoff valve (15), for hydraulic motor vehicle brake systems having an anti-skid and traction control apparatus, having a housing (33), a longitudinal bore (35) in said housing (33), an armature (36) and a first-closing body (46) carried by said armature and movable toward a first valve seat (59), a second closing body (47), said second closing body having said first valve seat (59) thereon for receiving said first closing body thereon, said armature moves said first closing body toward said first valve seat (59) counter to the force of a restoring first spring (43), a wall (42) juxtaposed said first closing body firmly attached within the longitudinal bore (35) to the housing (33), the wall having a through bore (54) through which a portion of said second closing body extends, said through bore like the longitudinal bore (35) communicates with a fluid flow connection upstream of said wall (42) and a flow connection downstream of said wall (42), the wall (42), on a side remote from the first closing body (46) includes a second valve seat (55) through which the through bore (54) discharges;

said second valve seat (55) is engaged by said second closing body (47) which includes an axially extending conduit (58) which extends from said first valve seat (59), the second closing body (47) is supported on the second valve seat (55) under the influence of a bearing force of a restoring second spring (49), and the biasing force of said second spring is greater than a force produced by the armature (36) to close said first closing body.

2. A multi-position valve as defined by claim 1, in which a sleeve (41) is disposed with a press fit in the longitudinal bore (35) of the housing (33), said sleeve includes a bottom which forms the wall (42) having the through bore (54) and the second valve seat (55);

the restoring second spring (49) and the second closing body (47), are received coaxially in the sleeve (41), the second closing body (47) has a collar (48) toward the second valve seat for engagement of the restoring second spring (49); and the sleeve (41) is provided with an annular disk (50) therein that is constantly permeable to pressure fluid, the second closing body (47) is longitudinally guided by said annular disk, and the restoring second spring (49) is supported by said annular disk.

* * * * *